United States Patent [19]

Ousley, II

[11] Patent Number: 4,861,294

[45] Date of Patent: Aug. 29, 1989

[54] SHAFT PRESSURE RING AND METHOD FOR LUBRICATING SHAFT LOG SEALS

[75] Inventor: Frank B. Ousley, II, Cocoa, Fla.

[73] Assignee: Sea Ray Boats, Inc., Merritt Island, Fla.

[21] Appl. No.: 65,253

[22] Filed: Jun. 22, 1987

[51] Int. Cl.[4] .................. B21D 39/00; B63H 5/00; F04D 29/06; F04D 29/10

[52] U.S. Cl. .................. 440/83; 29/428; 277/1; 277/68; 384/97; 416/174; 416/244 B; 440/112

[58] Field of Search .......... 277/1, 67, 68, 133, 277/25; 416/174, 244 B; 384/97, 478, 472, 315; 440/66, 68, 69, 70, 112, 113, 49, 83; 29/428

[56] References Cited

U.S. PATENT DOCUMENTS

| | | | |
|---|---|---|---|
| 815,740 | 3/1906 | Purvis | 440/69 X |
| 1,239,186 | 9/1917 | Jones . | |
| 1,364,923 | 1/1921 | Faber . | |
| 2,203,039 | 6/1940 | Aker | 384/97 |
| 2,416,519 | 2/1947 | Fountain et al. . | |
| 2,541,645 | 2/1951 | Fasoli | 384/478 |
| 2,945,710 | 7/1960 | Freed et al. | 277/68 |
| 3,266,578 | 8/1966 | McNeil | 416/244 B X |
| 3,371,644 | 3/1968 | Yost . | |
| 3,504,990 | 4/1970 | Sugden | 416/179 X |
| 3,583,356 | 6/1971 | Barker . | |
| 3,626,894 | 12/1971 | Stuart | 440/69 |
| 3,851,983 | 12/1974 | MacKenzie . | |
| 4,643,687 | 2/1987 | Yano et al. . | |

Primary Examiner—Allan N. Shoap
Attorney, Agent, or Firm—Malin, Haley & McHale

[57] ABSTRACT

A shaft pressure ring for use in conjunction with a boat having an inboard motor and a drive shaft protruding through a shaft logseal assembly mounted in the hull of the boat, the hull including a shaft log area surrounding the drive shaft, the shaft pressure ring comprising a deflector, the deflector having an inside diameter being annular in shape, the deflector being of a rigid material and adapted to be positioned upon the drive shaft a sufficient distance from the seal such that the shaft pressure ring will deflect a portion of the water passing beneath the hull of the boat in a direction toward, and onto, the shaft log seal. The splasher will continuously lubricate and cool the shaft log seal to prevent drying, burning, deterioration, and eventual leakage.

7 Claims, 1 Drawing Sheet

U.S. Patent     Aug. 29, 1989     4,861,294
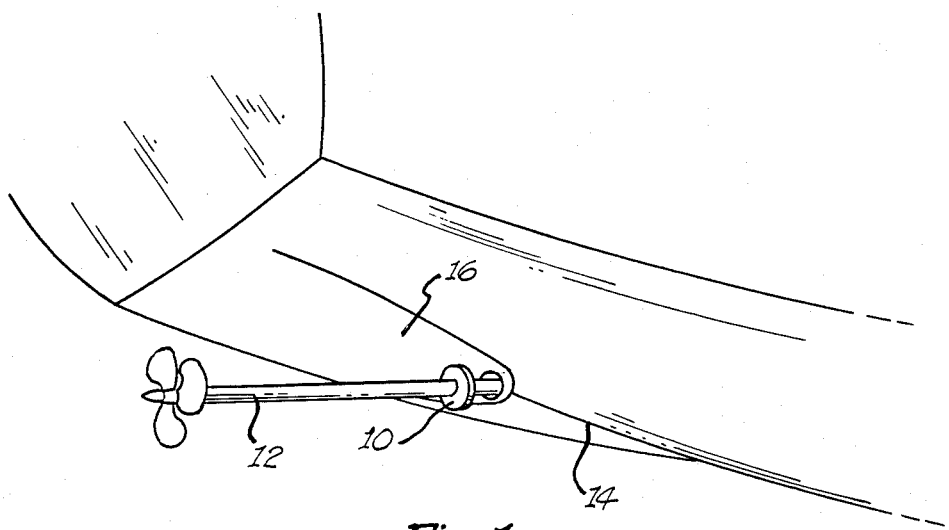
Fig. 1.
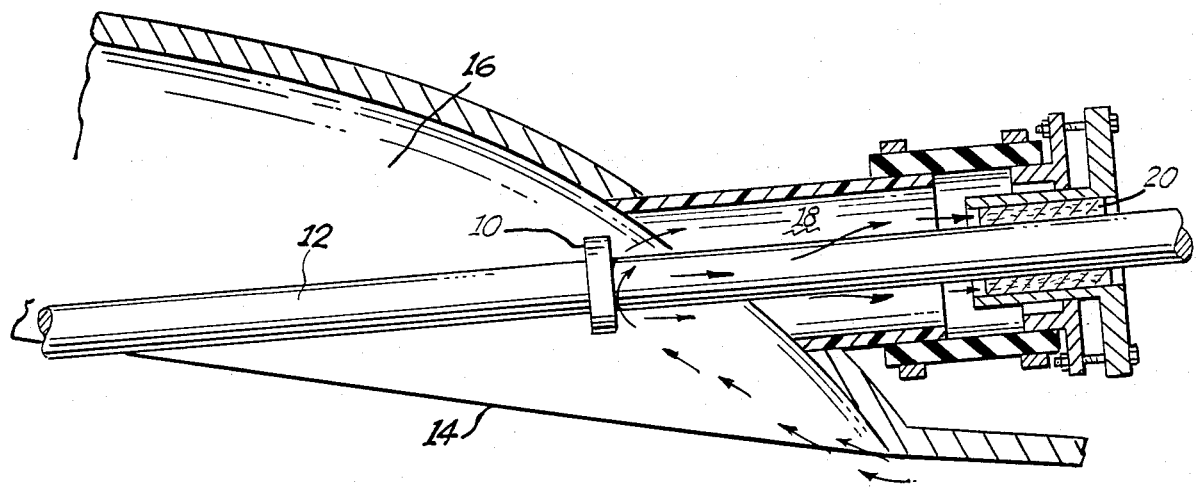
Fig. 2.
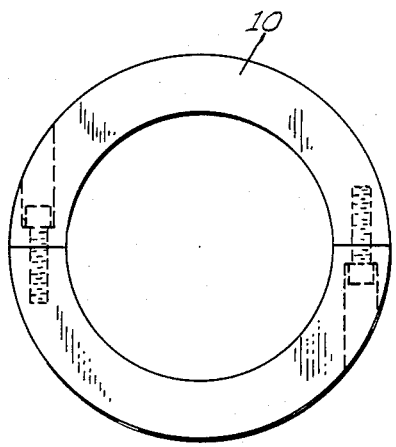     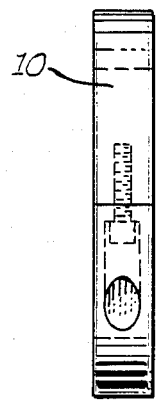
Fig. 3A.     Fig. 3B.

SHAFT PRESSURE RING AND METHOD FOR LUBRICATING SHAFT LOG SEALS

BACKGROUND OF THE INVENTION

The subject matter of the invention relates to a lubricating means, and more particularly to a shaft pressure ring utilized on inboard motor drive shaft assemblies for lubricating shaft log seals.

The marine industry has continuously been confronted with the problem of how to lubricate and cool shaft log seal assemblies. These drive shafts protrude through the hull of the boat and an obvious need exists for a shaft log which would allow the shaft to rotate at high speeds, resist the effects of thermal and mechanical deterioration, and provide a seal which prevents water leakage into the interior of the boat. The lubricating and sealing means becomes essential.

Typical solutions involve complex structural devices which entail an entirely independent lubrication system, or which entail units involving a plurality of bearings, couplings, mounting means, and custom interfacing structure required to be compatible with both the hull of the ship and often times the strut or motor coupling. Typical examples includes devices as disclosed in U.S. Pat. Nos. 3,177,841; 2,595,863; 2,416,519; and 3,529,839.

However, despite these solutions, artisans have failed to develop a simple yet efficient device and method for lubricating the shaft log seal assembly used in conjunction with inboard motor drive shafts.

It is therefore highly desirable to provide a shaft pressure ring which is simple, operationally efficient, yet cost effective.

It is also highly desirable to provide a shaft pressure ring which will continuously lubricate and cool a shaft log seal assembly.

It is also highly desirable to provide a shaft pressure ring which can be readily incorporated into drive shafts utilized with inboard motors and existing boat hulls without requiring modification to either the drive shaft, the boat hull, or the shaft log seal assembly.

It is also highly desirable to provide a shaft pressure ring which greatly prolongs the life of the shaft log seal assembly, and resists deterioration from marine conditions.

It is also highly desirable to provide a method for lubricating and cooling a shaft log seal assembly, the method being simple, operationally efficient, yet cost effective.

Finally, it is highly desirable to provide a shaft pressure ring and method for lubricating and cooling a shaft log seal assembly which incorporates all of the above mentioned features and objects.

SUMMARY OF THE INVENTION

It is therefore an object of the invention to provide a shaft pressure ring which is simple, operationally efficient, yet cost effective.

It is therefore an object of the invention to provide a shaft pressure ring which will continuously lubricate and cool a shaft log seal assembly.

It is therefore an object of the invention to provide a shaft pressure ring which can be readily incorporated into drive shafts utilized with inboard motors and existing boat hulls without requiring modification to either the drive shaft, the boat hull, or the shaft log seal assembly.

It is therefore an object of the invention to provide a shaft pressure ring which greatly prolongs the life of the shaft log seal assembly and resists deterioration from marine conditions.

It is therefore an object of the invention to provide a method for lubricating and cooling a shaft log seal assembly, the method being simple, operationally efficient, yet cost effective.

Finally, it is an object of the invention to provide a shaft pressure ring and method for lubricating and cooling a shaft log seal assembly which incorporates all of the above mentioned features and objects.

Briefly, what is provided is a shaft pressure ring for use in conjunction with a boat having an inboard motor and a drive shaft protruding through a shaft log seal assembly mounted in the hull of the boat, the hull including a shaft log area surrounding the drive shaft, the shaft pressure ring comprising a deflector, the deflector having an inside diameter being annular in shape, the deflector being of a rigid material and adapted to be positioned upon the drive shaft a sufficient distance from the seal such that the shaft pressure ring will deflect a portion of the water passing beneath the hull of the boat in a direction toward, and onto, the shaft log seal. The pressure ring will continuously lubricate and cool the shaft log seal to prevent drying, burning, deterioration, and eventual leakage.

BRIEF DESCRIPTION OF THE DRAWING

The above mentioned and other features and objects of this invention, and the manner of obtaining them, will become more apparent and the invention itself will be best understood by reference to the following description of an embodiment of the invention taken in conjunction with the accompanying drawings, wherein:

FIG. 1 is a perspective view illustrating the shaft pressure ring of the invention mounted upon a drive shaft for an inboard motor utilized in a boat hull having a shaft log area surrounding the drive shaft.

FIG. 2 is a partial cross sectional view illustrating the details of the invention shown in FIG. 1.

FIG. 3A is a front view illustrating an embodiment of the shaft pressure ring.

FIG. 3B is a side view of the pressure ring illustrated in FIG. 3A.

DESCRIPTION OF A SPECIFIC EMBODIMENT

Referring now to FIG. 1, the shaft pressure ring 10 of the invention is illustrated as mounted upon a drive shaft 12. It is understood that an inboard motor utilizes drive shaft 12, the drive shaft protruding through a shaft log seal assembly mounted in the hull 14 of the boat. Shaft log area 16 surrounds the drive shaft.

It will be appreciated that without the instant invention, water would pass beneath the hull of the boat, and because of the void created by the shaft log area, the water would not come into contact with the shaft log seal assembly due to the speed of the boat and the various pressure gradients created while the boat is in operation. This will further be described hereinafter with reference to FIG. 2.

The shaft pressure ring 10 is positioned such that a portion of the water passing beneath the hull 14 will now encounter the pressure ring. The pressure ring will act as a deflector which will repel a portion of the water in a forward direction, the water ultimately coming into contact with the shaft log seal assembly. In this manner, the pressure ring continuously lubricates and cools the shaft log seal assembly with deflected water, thereby dramatically prolonging the life of the seal.

Referring now to FIG. 2, the details of the invention are more accurately illustrated. Shaft pressure ring 10 is shown as detachably mounted about drive shaft 12. It would be readily understood to those of ordinary skill in the art that, in alternative embodiments, the shaft pressure ring can be integrally associated with the drive shaft 12, in a unitary assembly. The cross sectional view shows the bottom of the boat hull 14, as well as the boundary 16 of the shaft log area, which is a void surrounding the drive shaft 12. Channel 18 is a void formed by the hull of the boat. Drive shaft 12 protrudes through shaft log seal 20 into, and through, channel 18. Shaft log seal 20 is typically a fiber seal, which is a Teflon-coated packing material. The shaft log seal assembly prevents leakage by providing a barrier through which external water cannot travel into the interior of the boat.

The instant invention was meant to solve the problem caused by the fiber seal running dry after approximately eight to ten hours of use. The seal would harden on the surface, begin to crack and otherwise deteriorate, which would eventually cause leakage. Similarly, without adequate lubrication, thermal build-up in and about the shaft log seal area would cause further damage to the seal and directly shorten the seal life which would require further boat maintenance.

It will be seen that the spacing and dimensional distance between the shaft pressure ring 10 and the shaft log seal assembly is important. The shaft pressure ring 10 must be positioned such that it will encounter and repel a portion of the water passing beneath hull 14, and deflect the water into channel 18 and onto the shaft log seal 20. The precise placement of the shaft pressure ring 10 will depend upon the particular boat hull characteristics in order to achieve maximum effectiveness.

In a specific embodiment, the shaft pressure ring 10 is a ring having coaxial inner and outer dimensions. In alternative embodiments the outer boundary or shape of shaft pressure ring 10 could be of any particular geometry that would allow for adequate water deflection. However it is important to note that one does not want to cause turbulence or aerate the shaft log area which would decrease engine performance.

As is readily recognized, the drive shaft 12 terminates within the boat at the engine coupling, and terminates at the opposite end at the strut.

The essence of applicant's invention is that it avoids drying of the shaft log seal assembly, provides proper lubrication and cooling for the seal, with the result that seal deterioration and leakage is avoided.

FIGS. 3A and 3B illustrate a front view and side view, respectively, of one embodiment of the shaft pressure ring 10 of the invention.

While there have been described above the principles of this invention in connection with the specific apparatus, it is to be clearly understood that this description is made only by way of example and not as a limitation to the scope of the invention.

What is claimed is:

1. A drive shaft log seal lubricating and cooling system for a shaft pressure ring seal in a hull of a boat, activated by movement in water, with a log area portion in an aft portion of the boat hull comprising:
   a shaft pressure ring seal connected to a drive shaft, said drive shaft connectable to an inboard motor in said boat hull by way of a channel having an inner portion and an exit, said channel having a center line oriented at an angle to a horizontal in a generally upward, forward direction away from said log area portion and said aft portion, said exit positioned at said log area portion of said boat hull, said drive shaft exiting out of said boat hull through said channel and into said log area portion and extending through said inner portion, said shaft pressure ring seal positioned at said inner portion of said channel about said drive shaft to restrict the leakage of water into said boat hull, said log area portion having a generally concave shape in said boat hull around said exit,
   a deflector including deflector connecting means for connecting said deflector around and to said drive shaft in said log area portion and spaced from said exit and positioned outside of said boat hull,
   said deflector being of rigid material and having a deflecting surface means positioned generally perpendicular to said drive shaft, said deflecting surface means being operably positioned for deflecting water passing by said drive shaft and passing through said log area portion wherein said drive shaft is rotating, said deflecting surface means deflecting said water through said exit and into contact with said shaft pressure ring seal in said channel for continuous cooling and lubricating of said shaft pressure ring seal as said boat moves over and through said water.

2. The system as set forth in claim 1, wherein said deflector is generally ring-shaped and is detachably mounted upon said drive shaft, said deflector connecting means being for allowing adjustment of said deflector on said drive shaft in said log area portion.

3. The system as set forth in claim 1, wherein said deflector is in the shape of a ring having a flat deflecting face, said deflector having a circular outside and inside diameter and coaxial with one another.

4. A method of cooling a shaft pressure ring seal connected to a drive shaft connected to an inboard motor in a hull of a boat in water when the boat moves through said water, whereby said shaft pressure ring seal and a portion of said drive shaft are located in a channel in the boat hull, said channel having an inner portion and an exit, said shaft pressure ring seal positioned at said inner portion between said drive shaft and said channel to restrict the leakage of water into the boat hull, said drive shaft exiting out of said boat hull at said exit and passing into a log area portion having a generally concave shape in an aft portion of said boat hull around said exit, said channel having a center line positioned at an angle to a horizontal to extend in an upward, forward direction away from said log area portion and said aft portion, comprising the steps of:
   determining the position for attachment of a deflector on a portion of said drive shaft in said log area portion to deflect a portion of said water passed over by movement of said boat when said drive shaft is rotating and passing through said log area portion in a direction toward and onto said shaft pressure ring seal for continuous cooling and lubricating,
   connecting said deflector in a generally fixed position around and to said drive shaft exterior of said exit,
   providing said deflector with a deflecting surface having a generally rigid construction for deflecting said water onto said shaft pressure ring seal.

5. The method of claim 4 wherein said deflector is detachably mounted upon said drive shaft for adjustment purposes.

6. The method of claim 4 wherein said deflector is permanently fixed on said drive shaft.

7. The method of claim 4 wherein said deflector is in the shape of a ring, said deflector having an outside diameter being annular in shape and coaxial with said inside diameter.

* * * * *